(12) United States Patent
Ito (10) Patent No.: US 9,048,690 B2
(45) Date of Patent: Jun. 2, 2015

(54) IN-VEHICLE POWER SUPPLY APPARATUS (75) Inventor: Hiroyoshi Ito, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 692 days.

(21) Appl. No.: 12/680,803

(22) PCT Filed: Oct. 1, 2008

(86) PCT No.: PCT/JP2008/068249
§ 371 (c)(1),
(2), (4) Date: Mar. 30, 2010

(87) PCT Pub. No.: WO2009/044921
PCT Pub. Date: Apr. 9, 2009

(65) Prior Publication Data
US 2010/0229017 A1 Sep. 9, 2010

(30) Foreign Application Priority Data
Oct. 5, 2007 (JP) ................................. 2007-262166

(51) Int. Cl.
*H02J 7/14* (2006.01)
*G06F 1/28* (2006.01)
(Continued)

(52) U.S. Cl.
CPC ................. *H02J 7/1423* (2013.01); *G06F 1/28* (2013.01); *G06F 1/30* (2013.01); *H02J 7/1438* (2013.01); *H02J 7/1461* (2013.01); *H02J 2007/0095* (2013.01)

(58) Field of Classification Search
CPC ............. G06F 1/26; G06F 11/30; G06F 1/30; G06F 1/305; G06F 1/28; H02J 7/14; H02J 9/06; H02J 7/1423; H02J 7/1461; H02J 7/1438; H02J 2007/0095; H04L 12/10

USPC ......... 318/139, 140; 701/1, 22; 713/300, 310, 713/320–324, 330, 340
See application file for complete search history.

(56) References Cited

U.S. PATENT DOCUMENTS 6,269,450 B1 *  7/2001 Iwata et al. .................... 713/340
7,404,097 B2 *  7/2008 Yamamoto et al. ........... 713/323
(Continued)

FOREIGN PATENT DOCUMENTS

| EP | 1 968 195 A1 | 9/2008 |
|---|---|---|
| JP | A-62-053130 | 3/1987 |

(Continued)

OTHER PUBLICATIONS

Office Action issued in Japanese Application No. 2007-262166 dated May 23, 2011 (with translation).

(Continued)

*Primary Examiner* — Fahmida Rahman
(74) *Attorney, Agent, or Firm* — Oliff PLC (57) ABSTRACT

Provided is an in-vehicle power supply apparatus which supplies power to both a high-power load such as an actuator, and the CPU for controlling the high-lower load, and which is capable of preventing reduction in voltage of the CPU even when voltage of the in-vehicle power supply is momentarily reduced due to power consumption of the high-power load, and which include an auxiliary power supply having its capacity reduced so as to enable reduction of the size of the power supply apparatus. The in-vehicle power supply apparatus for supplying a power to both a power load, and a CPU for controlling the power load comprises: a first distribution line for distributing, to the power load, the power supplied from an in-vehicle power supply through a bus; a second distribution line for distributing, to the CPU, the power supplied from the in-vehicle power supply through the bus; an auxiliary power supply, connected to the second distribution line, for supplying the power to the CPU when a voltage is reduced in the bus; and a backward flow prevention section for preventing a charge stored in the auxiliary power supply from flowing into the bus.

6 Claims, 6 Drawing Sheets

(51) Int. Cl.
*G06F 1/30* (2006.01)
*H02J 7/00* (2006.01)

(56) References Cited

U.S. PATENT DOCUMENTS

| | | |
|---|---|---|
| 2003/0233179 A1 | 12/2003 | Matsubara et al. |
| 2004/0155121 A1 | 8/2004 | Watanabe et al. |
| 2005/0046280 A1 | 3/2005 | Itabashi et al. |
| 2005/0216135 A1* | 9/2005 | Sayama et al. ............ 701/1 |
| 2006/0200276 A1 | 9/2006 | Sayama et al. |
| 2007/0182348 A1* | 8/2007 | Ooishi et al. ............ 318/54 |

FOREIGN PATENT DOCUMENTS

| | | |
|---|---|---|
| JP | A-06-133453 | 5/1994 |
| JP | A-09-191569 | 7/1997 |
| JP | A 11-041834 | 2/1999 |
| JP | A 2006-011602 | 1/2006 |
| JP | A 2006-033906 | 2/2006 |
| JP | A-2006-325324 | 11/2006 |
| JP | A 2006-327479 | 12/2006 |
| JP | A 2007-180972 | 7/2007 |
| WO | WO 2007/074673 A1 | 7/2007 |

OTHER PUBLICATIONS

International Search Report issued in corresponding International Application No. PCT/JP2008/068249, mailed Jan. 7, 2009.

Written Opinion of the International Searching Authority issued in corresponding International Application No. PCT/JP2008/068249, mailed Jan. 7, 2009.

International Preliminary Report on Patentability issued in corresponding International Application No. PCT/JP2008/068249 completed Jan. 11, 2010.

* cited by examiner

IN-VEHICLE POWER SUPPLY APPARATUS

TECHNICAL FIELD

The present invention relates to an in-vehicle power supply apparatus, and more particularly to an in-vehicle power supply apparatus for supplying power to both a high-power load such as an actuator, and a CPU for controlling the high-power load.

BACKGROUND ART

A conventional in-vehicle power supply apparatus is disclosed in, for example, Patent Document 1. The in-vehicle power supply apparatus disclosed in Patent Document 1 is a power supply apparatus for supplying power to both a high-power load which consumes a large amount of power and a low-power load which consumes a small amount of power. The in-vehicle power supply apparatus includes: an in-vehicle power supply; a first distribution line for distributing, to the high-power load, power supplied from the in-vehicle power supply through a bus; and a second distribution line for distributing, to the low-power load, power supplied from the in-vehicle power supply through the bus. The high-power load and the low-power load are connected in parallel with each other by means of the first distribution line and the second distribution line.

Further, the in-vehicle power supply apparatus includes a back-up power supply and a transistor for voltage control. The in-vehicle power supply apparatus causes the back-up power supply and the transistor for voltage control to operate so as to suppress reduction of voltages of the first distribution line, the bus, and the second distribution line even when voltage of the in-vehicle power supply is momentarily reduced due to the power consumption of the high-power load.

Patent Document 1: Japanese Laid-Open Patent Publication No. 2006-11602

DISCLOSURE OF THE INVENTION

However, the conventional art as described above has the following problems. Specifically, when the power consumption of the high-power load is substantially large, the voltages of the first distribution line, the bus, and the second distribution line are simultaneously reduced. Therefore, when the high-power load is an actuator, and the low-power load is the CPU for controlling the actuator, the CPU may not control the actuator.

Further, as described above, the conventional art needs to have the transistor for voltage control and the high capacity back-up power supply so as to suppress the reduction of the voltages of the first distribution line and the second distribution line. This leads to increase in size of an in-vehicle power supply apparatus.

The present invention is made to solve the problems as described above, and an object of the present invention is to provide an in-vehicle power supply apparatus which supplies power to both a high-power load such as an actuator and the CPU for controlling the high-power load, and is capable of preventing reduction in voltage applied to the CPU even when voltage of an in-vehicle power supply is momentarily reduced due to power consumption of the high-power load, and includes an auxiliary power supply having a reduced capacity so as to enable reduction in size of the power supply apparatus.

The in-vehicle power supply apparatus according to the present invention is
an in-vehicle power supply apparatus for supplying a power to both a power load, and a CPU for controlling the power load, and the in-vehicle power supply apparatus comprises:
an in-vehicle power supply;
a first distribution line for distributing, to the power load, the power supplied from the in-vehicle power supply through a bus;
a second distribution line for distributing, to the CPU, the power supplied from the in-vehicle power supply through the bus;
an auxiliary power supply, connected to the second distribution line, for supplying the power to the CPU when a voltage is reduced in the bus; and
a backward flow prevention section for preventing a charge stored in the auxiliary power supply from flowing into the bus.

The present invention comprises the backward flow prevention section for preventing a charge stored in the auxiliary power supply from flowing into the bus. Therefore, when a voltage is momentarily reduced in the in-vehicle power supply due to the high-power load consuming a large amount of power, the entire charge stored in the auxiliary power supply is supplied to the CPU without supplying the power to the high-power load in the in-vehicle power supply apparatus for supplying a power to both a high-power load such as an actuator, and the CPU for controlling the high-power load. Therefore, according to the present invention, even when the voltage is momentarily reduced in the in-vehicle power supply due to the high-power load consuming a large amount of power, reduction in voltage to be applied to the CPU can be prevented. Further, the auxiliary power supply is used to supply power to the CPU, and therefore the auxiliary power supply has its capacity reduced, thereby enabling reduction of the size of the power supply apparatus.

According to the present invention,
it is preferable that a plurality of the CPU are connected in parallel with each other,
the auxiliary power supply is an individual auxiliary power supply provided for each CPU, and
the individual auxiliary power supply supplies the power to a corresponding one of the plurality of the CPU.

When the auxiliary power supply is provided for each CPU, power necessary for each CPU can be appropriately supplied by the corresponding auxiliary power supply.

According to the present invention,
it is preferable that a plurality of the CPU are connected in parallel with each other, and
the auxiliary power supply is a general auxiliary power supply which comprehensively supplies the power to all of the plurality of the CPU.

In this configuration, one auxiliary power supply can comprehensively supply power necessary for all of the CPUs. Further, it is unnecessary to provide an individual auxiliary power supply for each CPU, and therefore the number of components and the production process steps can be reduced, thereby enabling reduction in production cost.

According to the present invention,
it is preferable that a plurality of the CPU are connected in parallel with each other,
the auxiliary power supply includes an individual auxiliary power supply provided for each CPU, and a general auxiliary power supply,
the individual auxiliary power supply supplies the power to a corresponding one of the plurality of the CPU, and the general auxiliary power supply comprehensively supplies the power to all of the plurality of the CPU.

In this configuration, even when the individual auxiliary power supply is not able to supply sufficient power, the general auxiliary power supply can supply power which is short.

According to the present invention, it is preferable that a voltage detection section for detecting for a voltage of one of the first distribution line and the bus is further provided, and when reduction of the voltage of one of the first distribution line and the bus is detected, the CPU changes control of the power load in accordance with the reduction of the voltage.

When reduction of voltage of the first distribution line or the bus is detected, the CPU changes control of the power load in accordance with the reduction in voltage. Therefore, even when the voltage of the first distribution line or the bus is reduced, the CPU is capable of appropriately controlling the operation of the power load, thereby preventing the operation of the power load from being hindered.

According to the present invention, it is possible to provide an in-vehicle power supply apparatus which supplies power to both a high-power load such as an actuator, and the CPU for controlling the high-lower load, and which is capable of preventing reduction in voltage to be applied to the CPU even when voltage of the in-vehicle power supply is momentarily reduced due to the high-power load consuming a large amount of power, and which includes an auxiliary power supply having its capacity reduced so as to enable reduction of the size of the power supply apparatus.

DESCRIPTION OF REFERENCE NUMERALS 1, 101, 102, 103, 104 in-vehicle power supply apparatus
2 power load
3, 31 CPU
4 first distribution line
5 second distribution line
6 auxiliary power supply (individual auxiliary power supply)
7 backward flow prevention section
8 in-vehicle power supply
9 bus
22 voltage detection section
23 operation amount detection section
61 auxiliary power supply (general auxiliary power supply)

BEST MODE FOR CARRYING OUT THE INVENTION

First Embodiment

A first embodiment of the present invention will be described with reference to the drawings.

Figure 1:
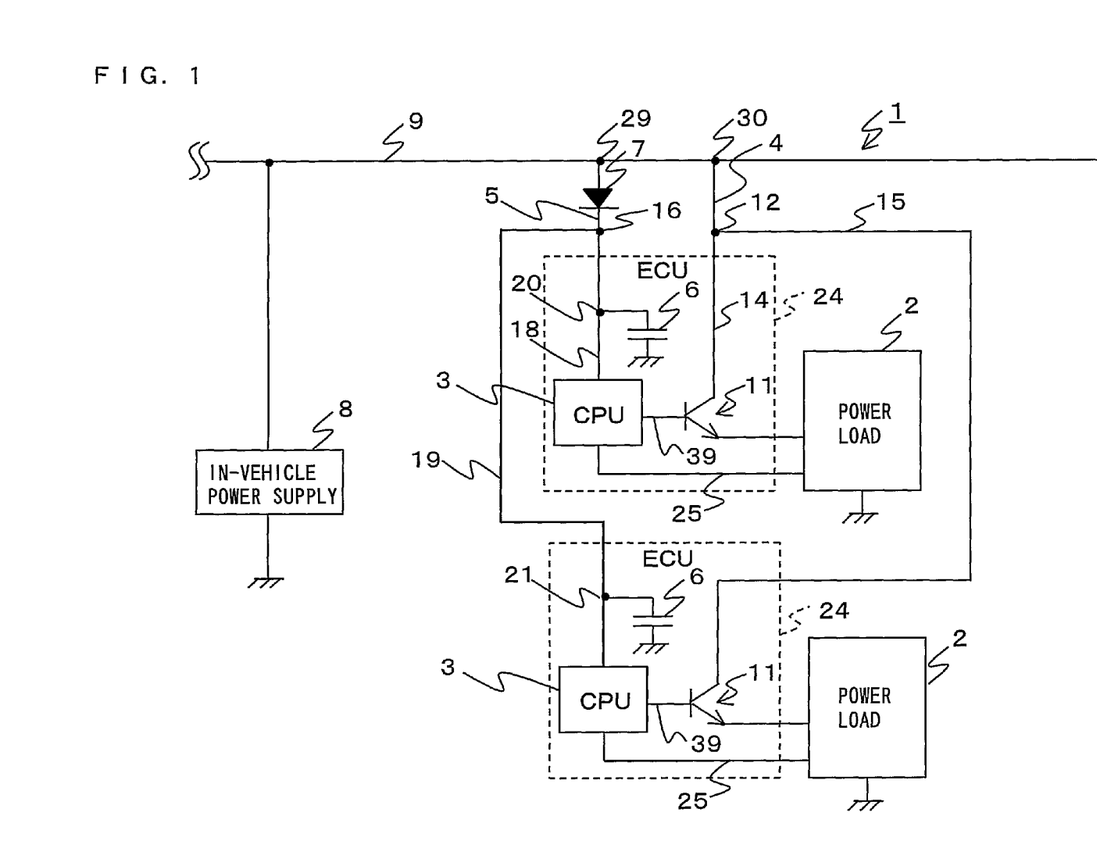
FIG. 1 is a diagram illustrating a configuration of an in-vehicle power supply apparatus according to a first embodiment.

FIG. 1 is a diagram illustrating a configuration of an in-vehicle power supply apparatus according to the first embodiment.

The in-vehicle power supply apparatus 1 according to the first embodiment is an in-vehicle power supply apparatus for supplying power to both a power load 2 and a CPU (central processing unit) 3 for controlling the power load 2.

The power load 2 is a high-power load which consumes a large amount of power. The power load 2 may be, for example, various actuators such as in-vehicle electric motors.

The CPU 3 is a main component of an ECU (electronic control unit) 24. The ECU 24 includes, for example, a transistor 11 for controlling, based on a control signal transmitted on signal line 39 from the CPU 3, power to be supplied to the power load 2, and the CPU 3 for controlling the transistor 11 and the power load 2. A reference numeral 25 in FIG. 1 represents a signal line for transmitting a control signal to the power load 2.

The in-vehicle power supply apparatus 1 includes: an in-vehicle power supply 8; a first distribution line 4; a second distribution line 5; an auxiliary power supply 6; and a backward flow prevention section 7.

The in-vehicle power supply 8 is a DC power supply. The in-vehicle power supply 8 includes, for example, a DC power generator for generating electric power by actuating an engine, and a battery for storing the electric power generated by the DC power generator.

The first distribution line 4 distributes, to the power load 2, power supplied from the in-vehicle power supply 8 through a bus 9. The first distribution line 4 is a line which branches from the bus 9 at a branch point 30. The power load 2 is connected to the first distribution line 4 through the transistor 11. The number of the power loads 2 is not limited to any specific number. For example, the number of the power loads 2 is two in FIG. 1. In an example shown in FIG. 1, the first distribution line 4 has a branch point 12, and the power loads 2 are connected through the transistors 11 to branch lines 14 and 15, respectively, of the first distribution line 4, both of which extend from the branch point 12.

The second distribution line 5 distributes, to the CPU 3, power supplied from the in-vehicle power supply 8 through the bus 9. The second distribution line 5 is a line which branches from the bus 9 at a branch point 29. The CPU 3 is connected to the second distribution line 5. Although the number of the CPUs 3 is not limited to any specific number, the number of the CPUs 3 is equal to the number of the power loads 2 in general. That is, in the example shown in FIG. 1, the number of the CPUs 3 is two. In the example shown in FIG. 1, the second distribution line 5 has a branch point 16, and the CPUs 3 are connected to branch lines 18 and 19, respectively, of the second distribution line 5, both of which extend from the branch point 16.

The auxiliary power supply 6 is connected to the second distribution line 5. The auxiliary power supply 6 supplies power to the CPU 3 when voltages of the first distribution line 4 and the bus 9 are momentarily reduced due to the power load 2 consuming a large amount of power. A type of the auxiliary power supply 6 is not limited to any specific type. For example, as shown in the drawings, the auxiliary power supply 6 may be a capacitor (auxiliary power supply capacitor). Alternatively, the auxiliary power supply 6 may be an electric storage device such as a secondary battery like a lead acid battery, an alkaline battery, or a lithium-ion battery, or any other type of battery. A time period of the momentary reduction in voltage is not limited to any specific time period. For example, the time period of the momentary reduction in voltage is about 100 milliseconds to several seconds. In the example shown in FIG. 1, the auxiliary power supply 6 is an individual auxiliary power supply provided for each CPU 3. The auxiliary power supply 6 supplies power to one corresponding CPU 3. In the example shown in FIG. 1, the branch lines 18 and 19 of the second distribution line 5 have branch points 20 and 21, respectively. The auxiliary power supply 6 in the branch line 18 has one terminal connected to the branch point 20 and has the other terminal grounded. On the other hand, the auxiliary power supply 6 in the branch line 19 has one terminal connected to the branch point 21 and has the other terminal grounded. The auxiliary power supply 6 may function as an auxiliary power supply only or may have another function in addition to the function as the auxiliary power supply. For example, when the auxiliary power supply 6 is an auxiliary power supply capacitor, the auxiliary power supply 6 may have a function to smooth DC voltage of the second distribution line 5 which varies in accordance with an operation performed by the CPU 3, in addition to the function as the auxiliary power supply.

The backward flow prevention section 7 prevents charge stored in the auxiliary power supply 6 from flowing into the bus 9. A type of the backward flow prevention section 7 is not limited to any specific type. For example, in an example shown in the drawings, the backward flow prevention section 7 may be a diode (backward flow prevention diode), a transistor (backward flow prevention transistor), or the like. The backward flow prevention section 7 is provided in the second distribution line 5. Specifically, the backward flow prevention section 7 is provided between the branch point 29 and the branch point 16. The backward flow prevention section 7 has an anode at one end nearer to the bus 9 and a cathode at the other end nearer to the CPU 3.

Hereinafter, an operation performed by the in-vehicle power supply apparatus 1 according to the first embodiment will be described with reference to FIG. 1. In the following description, it is assumed that the power loads 2 are a cell-motor (starter motor) and a car navigation system.

The auxiliary power supply 6 receives current from the in-vehicle power supply 8 and previously stores charge corresponding to a rated voltage of the in-vehicle power supply 8. The rated voltage of the in-vehicle power supply 8 is, for example, 12 volts.

Next, voltages of the first distribution line 4, the bus 9, and the in-vehicle power supply 8 are momentarily reduced due to operations performed by the power loads 2 corresponding to the cell-motor (starter motor) and the car navigation system. A time period from start of reduction of voltages of the first distribution line 4, the bus 9, and the in-vehicle power supply 8 from the rated voltage value to return to the rated voltage value is, for example, 100 milliseconds to several seconds. The voltage of each of the first distribution line 4, the bus 9, and the in-vehicle power supply 8 is momentarily reduced to, for example, 5 volts or less.

When the voltage of the bus 9 is reduced, charge is emitted from the auxiliary power supply 6 and flows through the CPU 3 corresponding to the auxiliary power supply 6. The second distribution line 5 includes the backward flow prevention section 7, and therefore the charge emitted from the auxiliary power supply 6 does not flow into the bus 9. Accordingly, the charge is supplied to the CPU 3 only. As a result, the momentary reduction in voltage of the bus 9 does not influence the voltage of the second distribution line 5, and voltage necessary for operation of the CPU 3 is secured, thereby enabling the CPU 3 to accurately operate.

According to the first embodiment, in the in-vehicle power supply apparatus 1 for supplying power to both the power load 2 and the CPU 3 for controlling the power load 2, reduction in voltage to be applied to the CPU 3 can be prevented even when voltage of the in-vehicle power supply 8 is momentarily reduced due to the power load 2 consuming a large amount of power. Therefore, the CPU 3 is able to accurately control the power load 2 at any time. Further, according to the first embodiment, the auxiliary power supply 6 supplies power to the CPU 3 only, and therefore the capacity of the auxiliary power supply 6 may be reduced so as to reduce the size of the in-vehicle power supply apparatus 1.

Second Embodiment

A second embodiment of the present invention will be described with reference to the drawings.

Figure 2:
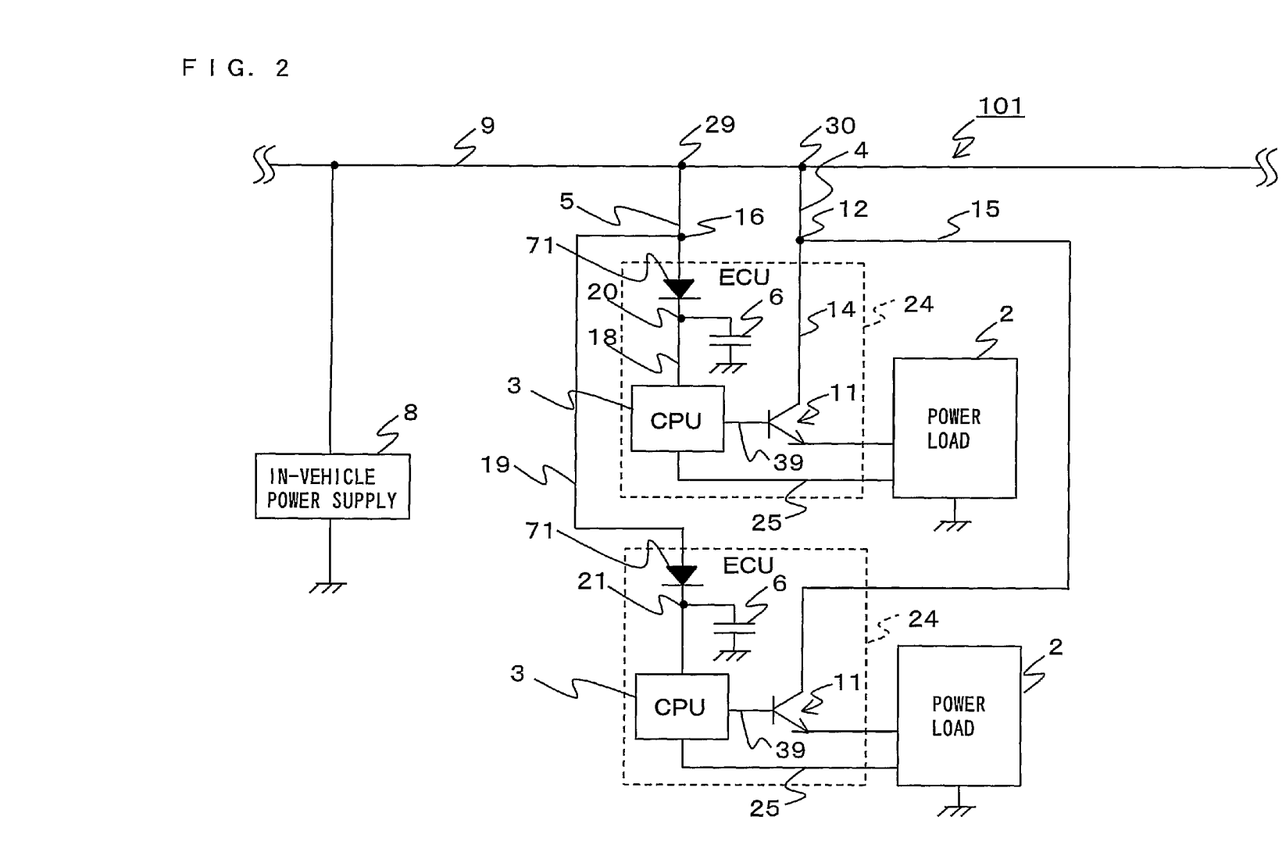
FIG. 2 is a diagram illustrating a configuration of an in-vehicle power supply apparatus according to a second embodiment.

FIG. 2 is a diagram illustrating a configuration of an in-vehicle power supply apparatus according to the second embodiment.

The components which are the same as described for the first embodiment are denoted by the same corresponding reference numerals, respectively, and the description thereof is not given.

The second embodiment is different from the first embodiment in the number of the backward flow prevention sections, and the positions thereof. Except for these, the second embodiment has the same configuration as the first embodiment.

According to the second embodiment, as shown in FIG. 2, backward flow prevention sections 71 are provided in the second distribution line 5 between the branch point 16 and the branch point 20, and between the branch point 16 and the branch point 21.

In this case, the backward flow prevention sections 71 each prevents charge emitted by the corresponding auxiliary power supply 6 from flowing back into the bus 9. Therefore, the effect obtained in the second embodiment is the same as described for the first embodiment.

Third Embodiment

A third embodiment of the present invention will be described with reference to the drawings.

Figure 3:
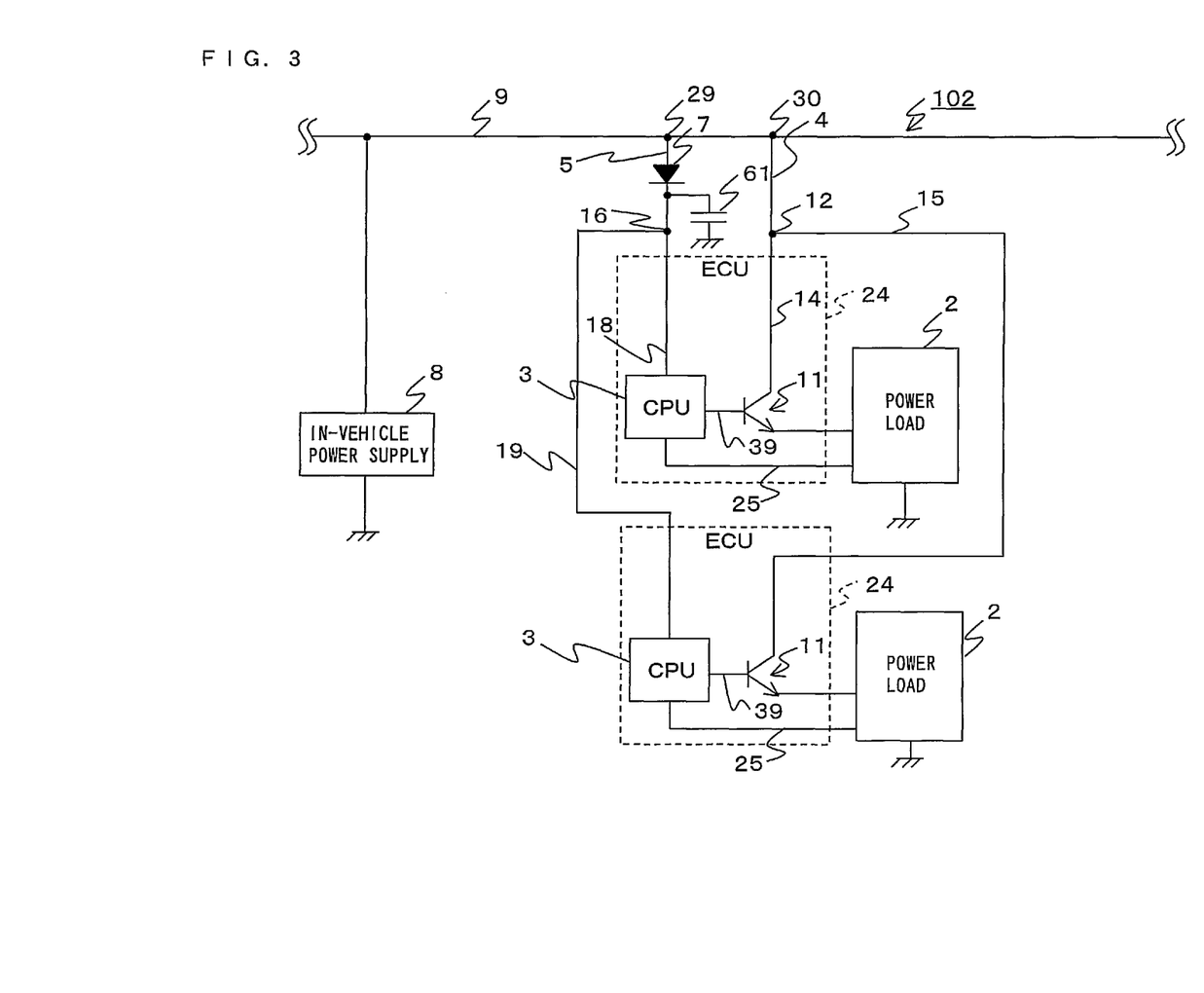
FIG. 3 is a diagram illustrating a configuration of an in-vehicle power supply apparatus according to a third embodiment.

FIG. 3 is a diagram illustrating a configuration of an in-vehicle power supply apparatus according to the third embodiment.

The components which are the same as described for the first embodiment are denoted by the same corresponding reference numerals, respectively, and the description thereof is not given.

The third embodiment is different from the first embodiment in the number of the auxiliary power supplies, and the position thereof. Except for these, the third embodiment has the same configuration as the first embodiment.

According to the third embodiment, an auxiliary power supply 61 is a general auxiliary power supply which comprehensively supplies power to all of the CPUs 3. The auxiliary power supply 61 supplies power to each CPU 3. In an example shown in FIG. 3, the number of the auxiliary power supply 61 is one. In the example shown in FIG. 3, the one auxiliary power supply 61 is capable of supplying power necessary for the operations of all of the CPUs 3. The number of the auxiliary power supply 61 may be greater than one. In this case, a plurality of the auxiliary power supply 61 are capable of supplying power necessary for the operations of all of the CPUs 3.

According to the third embodiment, the one auxiliary power supply 61 is capable of comprehensively supplying power necessary for all of the CPUs 3. Further, it is unnecessary to provide an individual auxiliary power supply for each CPU, and therefore the number of components and the production process steps can be reduced, thereby enabling reduction in production cost.

Fourth Embodiment

A fourth embodiment of the present invention will be described with reference to the drawings.

Figure 4:
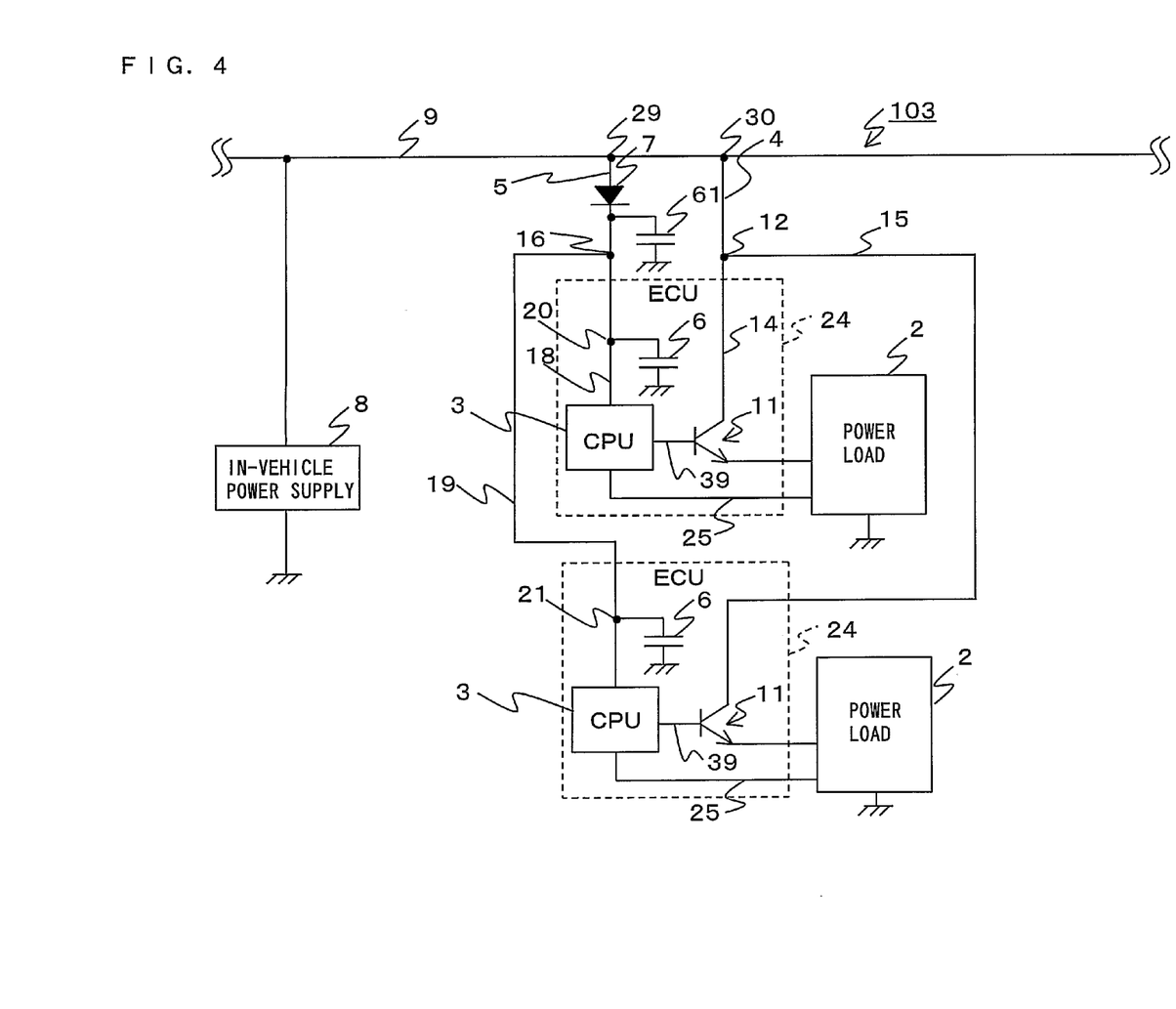
FIG. 4 is a diagram illustrating a configuration of an in-vehicle power supply apparatus according to a fourth embodiment.

FIG. 4 is a diagram illustrating a configuration of an in-vehicle power supply apparatus according to the fourth embodiment.

The components which are the same as described for the first embodiment are denoted by the same corresponding reference numerals, respectively, and the description thereof is not given.

The fourth embodiment is different from the first embodiment in the number of the auxiliary power supplies, and the positions thereof. Except for these, the fourth embodiment has the same configuration as the first embodiment.

The auxiliary power supply according to the fourth embodiment includes the individual auxiliary power supply 6 which is the same as described for the first embodiment, and the general auxiliary power supply 61 which is the same as described for the third embodiment. The individual auxiliary power supply 6 is provided for each CPU 3 as in the first embodiment. The individual auxiliary power supply 6 supplies power to one corresponding CPU 3. The general auxiliary power supply 61 supplies power to each CPU 3 as in the third embodiment.

According to the fourth embodiment, even when the individual auxiliary power supply 6 is not able to supply sufficient power, the general auxiliary power supply 61 can supply power which is short.

Fifth Embodiment

A fifth embodiment of the present invention will be described with reference to the drawings.

Figure 5:
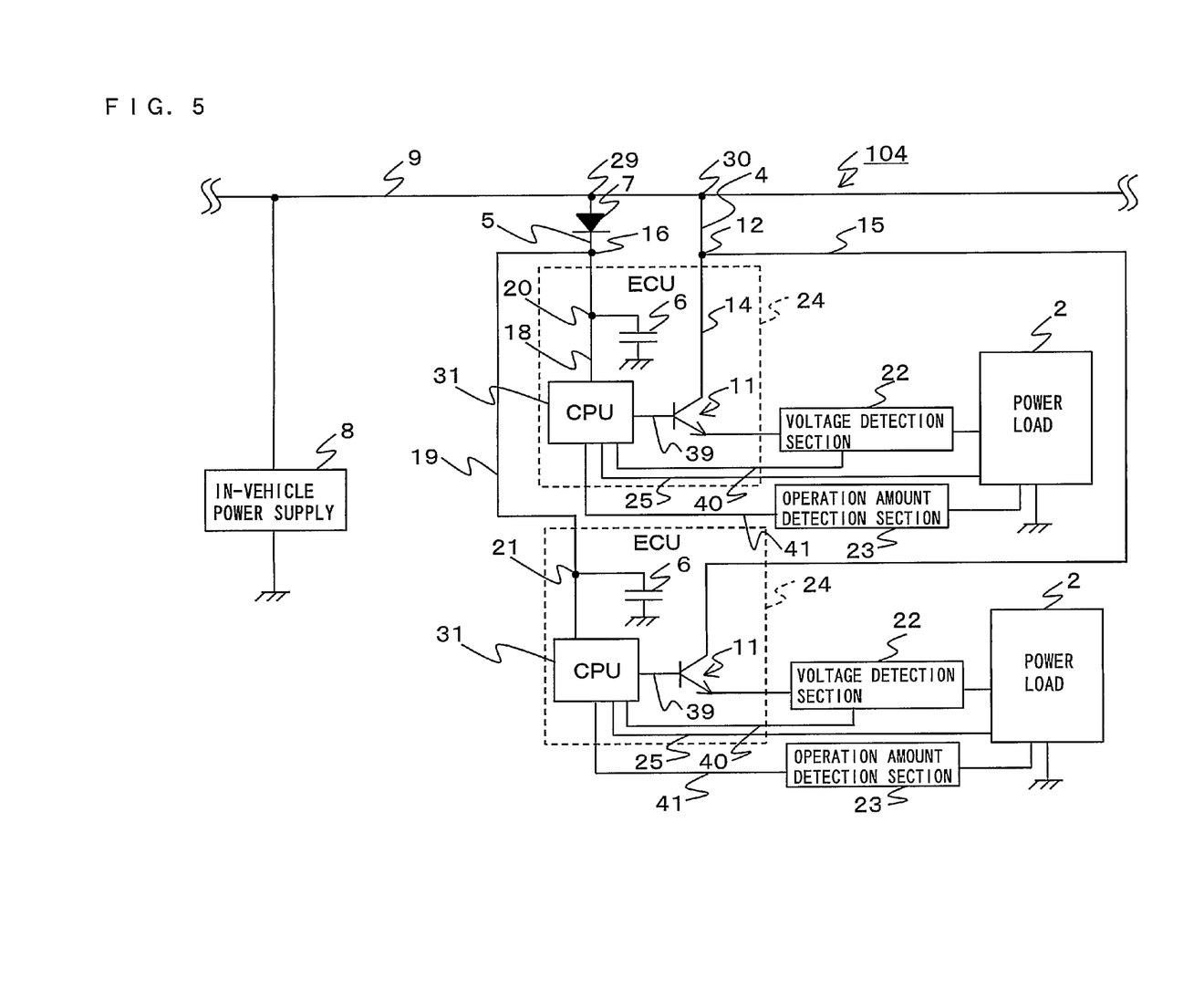
FIG. 5 is a diagram illustrating a configuration of an in-vehicle power supply apparatus according to a fifth embodiment.

FIG. 5 is a diagram illustrating a configuration of an in-vehicle power supply apparatus according to the fifth embodiment.

The components which are the same as described for the first embodiment are denoted by the same corresponding reference numerals, respectively, and the description thereof is not given.

The fifth embodiment is different from the first embodiment in that in the fifth embodiment a voltage detection section 22 and an operation amount detection section 23 are further provided, and the CPU 31 is provided instead of the CPU 3. Except for these, the fifth embodiment has the same configuration as the first embodiment.

The voltage detection section 22 detects for voltage of the first distribution line 4 or the bus 9. The detected voltage value is inputted to the CPU 31 via signal line 40.

The operation amount detection section 23 detects for an amount of operation performed by the power load 2. The amount of operation performed by the power load 2 is represented as, for example, the number of revolutions of the cell-motor (starter motor) and/or any other motor. However, the amount of operation performed by the power load 2 is not limited to any specific value or the like. The detected amount of operation is inputted to the CPU 31 via signal line 41.

When reduction in voltage of the first distribution line 4 or the bus 9 is detected, the CPU 31 changes the control of the power load 2 in accordance with the reduction in voltage and the amount of operation performed by the power load 2. The change of the control represents change of control for causing the power load 2 to accurately operate. For example, the control is changed such that a resistance value of a circuit in the power load 2 is reduced in accordance with the reduction in voltage of the first distribution line 4 or the bus 9, so as to increase current flowing through the circuit in the power load 2, thereby obtaining a constant power consumption.

Figure 6:
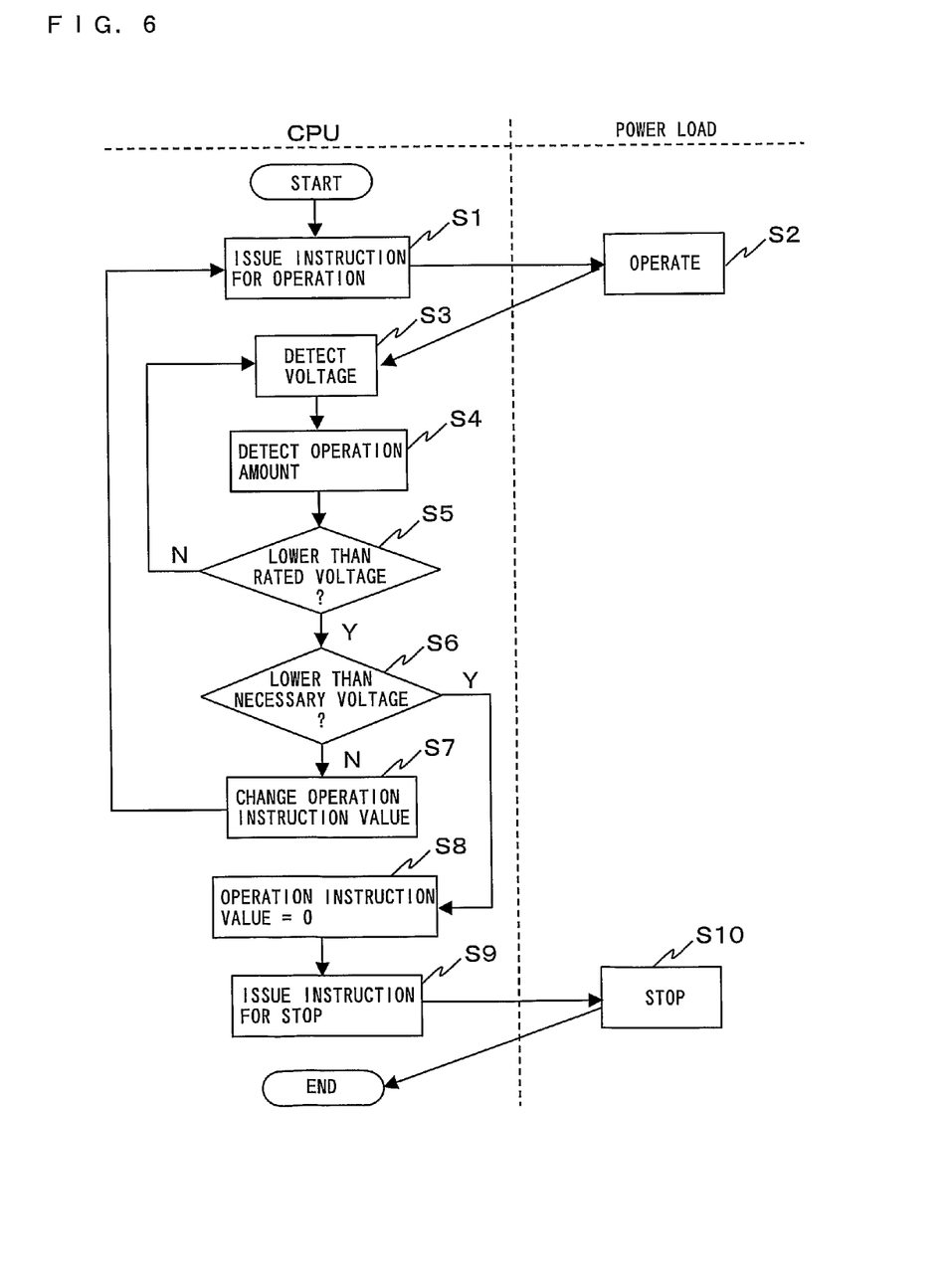
FIG. 6 is a diagram illustrating a sequence of an operation of the in-vehicle power supply apparatus according to the fifth embodiment.

Hereinafter, an operation performed by the in-vehicle power supply apparatus 104 according to the fifth embodiment will be described with reference to the drawings.

FIG. 6 is a diagram illustrating a sequence of an operation performed by the in-vehicle power supply apparatus 104.

Initially, the CPU 31 instructs the power load 2 to operate (step S1). The instruction for operation is made by the CPU 31 transmitting, to the power load 2, a signal indicative of an operation instruction value. The operation instruction value represents a content of the instruction for operation issued to the power load 2. Then, the power load 2 operates (step S2).

Next, the voltage detection section 22 detects for voltage of the first distribution line 4 or the bus 9 (step S3). Next, the operation amount detection section 23 detects for an amount of operation performed by the power load 2 (step S4).

Subsequently, the CPU 31 determines whether or not the detected voltage is lower than the rated voltage (for example, 12 volts) (step S5). When the CPU 31 determines that the detected voltage is lower than the rated voltage, the CPU 31 determines whether or not the detected voltage is lower than a minimum voltage (hereinafter, referred to as necessary voltage) necessary for the power load 2 to operate (step S6). When the CPU 31 determines in step S5 that the detected voltage is not lower than the rated voltage, the process is returned to step S3.

When the CPU 31 determines in step S6 that the detected voltage is higher than or equal to the necessary voltage, the operation instruction value for the power load 2 is changed based on the detected voltage and the detected operation amount (step S7). Next, the CPU 31 instructs the power load 2 to operate based on the changed operation instruction value (step S1). On the other hand, when the CPU 31 determines in step S6 that the detected voltage is lower than the necessary voltage, the operation instruction value is changed to zero. That the operation instruction value is zero means that the power load 2 is instructed to stop (step S8). Subsequently, based on the changed operation instruction value (representing zero), the CPU 31 instructs the power load 2 to stop operating (step S9). Then, the power load 2 stops operating (step S10).

According to the fifth embodiment, when reduction in voltage of the first distribution line 4 or the bus 9 is detected, the CPU 31 changes control of the power load in accordance with the reduction in voltage. Therefore, even when the voltage of the first distribution line 4 or the bus 9 is reduced, the CPU 31 is able to accurately control the operation of the power load 2. Accordingly, the operation of the power load 2 is not hindered.

Although in each embodiment the transistor 11 is included in the ECU 24, the transistor 11 may be provided outside the ECU 24 so as to be near the power load 2. The transistor 11 forms an actuation section for actuating the power load 2. In this case, the actuation section for actuating the power load 2 is provided so as to be independent of the ECU 24 and be integral with the power load 2.

INDUSTRIAL APPLICABILITY

The in-vehicle power supply apparatus according to the present invention is applicable as an in-vehicle power supply apparatus and the like for supplying power to both a high-power load such as an actuator, and the CPU for controlling the high-power load.

The invention claimed is:

1. An in-vehicle power supply apparatus for supplying a power to both a power load, and a CPU for controlling the power load, the in-vehicle power supply apparatus comprising:
   an in-vehicle power supply;
   a bus extending from the in-vehicle power supply;
   a first distribution line branching from the bus and being connected to the power load, the first distribution line distributing, to the power load, the power supplied from the in-vehicle power supply through the bus;
   a second distribution line branching from the bus and being connected to the CPU, the second distribution line distributing, to the CPU, the power supplied from the in-vehicle power supply through the bus;
   an auxiliary power supply, connected to the second distribution line, for supplying the power to the CPU when a voltage is reduced in the bus;
   a backward flow prevention section being connected, in the second distribution line, between a branch point at which the second distribution line branches from the bus, and a connection point to which the auxiliary power supply is connected, the backward flow prevention section preventing a charge stored in the auxiliary power supply from flowing from the connection point side to the branch point side; and
   a voltage detection section for detecting a voltage of the first distribution line and the bus, wherein:
   when reduction of the voltage of one of the first distribution line and the bus is detected, the CPU (1) determines whether the detected voltage of one of the first distribution line and the bus is lower than a necessary voltage that is a minimum voltage necessary for the power load to operate, (2) instructs the power load to stop when the detected voltage is lower than the necessary voltage, and (3) changes an operation instruction to the power load when the detected voltage is equal to or higher than the necessary voltage,
   the power load includes a circuit in which a value of current flowing thereto varies depending on a resistance value of the circuit, and
   when reduction in voltage of one of the first distribution line and the bus is detected, the CPU reduces the resistance value to increase the current flowing into the circuit in the power load when the CPU determines that the detected voltage of one of the first distribution line and the bus is smaller than a necessary voltage that is a minimum voltage necessary for operating the power load.

2. The in-vehicle power supply apparatus according to claim 1,
   wherein a plurality of CPU are connected in parallel with each other, the plurality of CPU includes the CPU, wherein the auxiliary power supply is an individual auxiliary power supply provided for each of the plurality of the CPU, and
   wherein the individual auxiliary power supply supplies the power to a corresponding one of the plurality of the CPU.

3. The in-vehicle power supply apparatus according to claim 1,
   wherein a plurality of CPU are connected in parallel with each other, the plurality of CPU includes the CPU, and
   wherein the auxiliary power supply is a general auxiliary power supply which comprehensively corresponds to all of the plurality of the CPU, and
   wherein the general auxiliary power supply comprehensively supplies the power to all of the plurality of the CPU.

4. The in-vehicle power supply apparatus according to claim 1, wherein the backward flow prevention section is a backward flow prevention diode.

5. An in-vehicle power supply apparatus for supplying a power to both a power load, and a CPU for controlling the power load, the in-vehicle power supply apparatus comprising:
   an in-vehicle power supply;
   a bus extending from the in-vehicle power supply;
   a first distribution line branching from the bus and being connected to the power load, the first distribution line distributing, to the power load, the power supplied from the in-vehicle power supply through the bus;
   a second distribution line branching from the bus and being connected to the CPU, the second distribution line distributing, to the CPU, the power supplied from the in-vehicle power supply through the bus;
   an auxiliary power supply, connected to the second distribution line, for supplying the power to the CPU when a voltage is reduced in the bus;
   a backward flow prevention section being connected, in the second distribution line, between a branch point at which the second distribution line branches from the bus, and a connection point to which the auxiliary power supply is connected, the backward flow prevention section preventing a charge stored in the auxiliary power supply from flowing from the connection point side to the branch point side; and
   a voltage detection section for detecting a voltage of the first distribution line and the bus, wherein;
   when reduction of the voltage of one of the first distribution line and the bus is detected, the CPU (1) determines whether the detected voltage of one of the first distribution line and the bus is lower than a necessary voltage that is a minimum voltage necessary for the power load to operate, (2) instructs the power load to stop when the detected voltage is lower than the necessary voltage, and (3) changes an operation instruction to the power load when the detected voltage is equal to or higher than the necessary voltage,
   a plurality of CPU are connected in parallel with each other, the plurality of CPU includes the CPU,
   the auxiliary power supply includes an individual auxiliary power supply provided for each of the plurality of the CPU, and a general auxiliary power supply comprehensively corresponding to all the plurality of the CPU,
   the individual auxiliary power supply supplies the power to a corresponding one of the plurality of the CPU, and
   the general auxiliary power supply comprehensively supplies the power to all of the plurality of the CPU.

6. The in-vehicle power supply apparatus according to claim 5, wherein the backward flow prevention section is a backward flow prevention diode.

* * * * *